US009069553B2

(12) United States Patent
Zaarur et al.

(10) Patent No.: US 9,069,553 B2
(45) Date of Patent: Jun. 30, 2015

(54) SWITCHING TASKS BETWEEN HETEROGENEOUS CORES

(75) Inventors: Ofer Zaarur, Brookline, MA (US); Premanand Sakarda, Acton, MA (US)

(73) Assignee: Marvell World Trade Ltd., St. Michael (BB)

( * ) Notice: Subject to any disclaimer, the term of this patent is extended or adjusted under 35 U.S.C. 154(b) by 251 days.

(21) Appl. No.: 13/604,407

(22) Filed: Sep. 5, 2012

(65) Prior Publication Data

US 2013/0061237 A1    Mar. 7, 2013

Related U.S. Application Data

(60) Provisional application No. 61/531,544, filed on Sep. 6, 2011, provisional application No. 61/676,482, filed on Jul. 27, 2012.

(51) Int. Cl.
| | |
|---|---|
| *G06F 9/46* | (2006.01) |
| *G06F 1/32* | (2006.01) |
| *G06F 9/48* | (2006.01) |
| *G06F 9/50* | (2006.01) |
| *G06F 9/44* | (2006.01) |

(52) U.S. Cl.
CPC ............ *G06F 1/3287* (2013.01); *G06F 9/4856* (2013.01); *G06F 9/5094* (2013.01); *G06F 1/329* (2013.01); *G06F 1/3293* (2013.01); *G06F 9/44* (2013.01); *Y02B 60/144* (2013.01); *Y02B 60/162* (2013.01); *Y02B 60/142* (2013.01); *Y02B 60/121* (2013.01); *Y02B 60/1282* (2013.01)

(58) Field of Classification Search
None
See application file for complete search history.

(56) References Cited

U.S. PATENT DOCUMENTS

| | | | |
|---|---|---|---|
| 5,535,397 | A | 7/1996 | Durante et al. |
| 5,649,135 | A | 7/1997 | Pechanek et al. |
| 5,768,500 | A | 6/1998 | Agrawal et al. |
| 5,778,070 | A | 7/1998 | Mattison |
| 5,933,627 | A | 8/1999 | Parady |
| 5,943,493 | A | 8/1999 | Teich et al. |
| 6,018,759 | A | 1/2000 | Doing et al. |
| 6,151,668 | A | 11/2000 | Pechanek et al. |
| 6,446,191 | B1 | 9/2002 | Pechanek et al. |
| 6,615,355 | B2 | 9/2003 | Mattison |
| 7,203,821 | B2 | 4/2007 | Thimmannagari |
| 7,249,246 | B1 | 7/2007 | Banning et al. |
| 7,315,956 | B2 | 1/2008 | Jensen et al. |
| 7,334,086 | B2 | 2/2008 | Hass et al. |
| 7,598,752 | B2 | 10/2009 | Li |

(Continued)

FOREIGN PATENT DOCUMENTS

WO    WO-2013036640    3/2013

OTHER PUBLICATIONS

"PCT Search Report and Written Opinion", Application No. PCT/US2012/053964, Dec. 14, 2012, 16 pages.

(Continued)

*Primary Examiner* — Camquy Truong
*Assistant Examiner* — Mehran Kamran

(57) ABSTRACT

The present disclosure describes techniques for switching tasks between heterogeneous cores. In some aspects it is determined that a task being executed by a first core of a processor can be executed by a second core of a processor, the second core having an instruction set that is different from that of the first core, and execution of the task is switched from the first core to the second core effective to decrease an amount of energy consumed by the processor.

17 Claims, 9 Drawing Sheets

(56) References Cited

U.S. PATENT DOCUMENTS

| | | | |
|---|---|---|---|
| 7,647,473 | B2 | 1/2010 | Kamigata et al. |
| 7,765,342 | B2 | 7/2010 | Whalley et al. |
| RE41,703 | E | 9/2010 | Pechanek et al. |
| 7,818,542 | B2 | 10/2010 | Shen et al. |
| 8,095,775 | B1 | 1/2012 | Khan et al. |
| 8,884,920 | B1 | 11/2014 | Switzer et al. |
| 2002/0161986 | A1 | 10/2002 | Kamigata et al. |
| 2004/0003309 | A1* | 1/2004 | Cai et al. ............. 713/320 |
| 2004/0193929 | A1* | 9/2004 | Kuranuki ............. 713/322 |
| 2005/0050542 | A1 | 3/2005 | Davis et al. |
| 2006/0288244 | A1* | 12/2006 | Cai et al. ............. 713/300 |
| 2007/0136561 | A1 | 6/2007 | Whalley et al. |
| 2007/0262962 | A1 | 11/2007 | XiaoPing et al. |
| 2007/0283358 | A1* | 12/2007 | Kasahara et al. ....... 718/104 |
| 2008/0263324 | A1* | 10/2008 | Sutardja et al. ........ 712/43 |
| 2009/0019257 | A1 | 1/2009 | Shen et al. |
| 2009/0165014 | A1* | 6/2009 | Park ................. 718/105 |
| 2009/0210069 | A1* | 8/2009 | Schultz et al. ........ 700/7 |
| 2009/0315258 | A1 | 12/2009 | Wallace et al. |
| 2009/0318229 | A1 | 12/2009 | Zielinski et al. |
| 2010/0199288 | A1 | 8/2010 | Kalman |
| 2010/0242014 | A1* | 9/2010 | Zhu ................. 717/106 |
| 2010/0282525 | A1 | 11/2010 | Stewart |
| 2010/0309223 | A1* | 12/2010 | Roth ................. 345/629 |
| 2011/0214023 | A1* | 9/2011 | Barlow et al. ......... 714/46 |
| 2013/0182759 | A1* | 7/2013 | Kim et al. ............ 375/240.02 |
| 2014/0082630 | A1* | 3/2014 | Ginzburg et al. ....... 718/105 |
| 2014/0129808 | A1* | 5/2014 | Naveh et al. .......... 712/225 |

OTHER PUBLICATIONS

"Advisory Action", U.S. Appl. No. 12/356,761, Aug. 8, 2014, 3 pages.

"Calling convention", Retrieved from <http://en.wikipedia.org/w/index.php?title=Calling_convention&oldid=162306164> on Apr. 15, 2014, Oct. 4, 2007, 2 pages.

"Coding Laboratory—I2C on an AVR using bit banging", Retrieved from <http://codinglab.blogspot.com/2008/10/i2c-on-avr-using-bit-banging.html> on Sep. 22, 2014, Oct. 14, 2008, 5 pages.

"Final Office Action", U.S. Appl. No. 12/254,506, Oct. 9, 2014, 6 pages.

"Final Office Action", U.S. Appl. No. 12/254,506, Oct. 13, 2011, 26 pages.

"Final Office Action", U.S. Appl. No. 12/356,761, May 1, 2014, 6 pages.

"Final Office Action", U.S. Appl. No. 12/356,761, Jun. 3, 2011, 10 pages.

"Non-Final Office Action", U.S. Appl. No. 13/477,664, Dec. 20, 2013, 9 pages.

"Non-Final Office Action", U.S. Appl. No. 12/254,506, Apr. 24, 2014, 18 pages.

"Non-Final Office Action", U.S. Appl. No. 12/254,506, Apr. 26, 2011, 18 pages.

"Non-Final Office Action", U.S. Appl. No. 12/274,235, Mar. 17, 2011, 11 pages.

"Non-Final Office Action", U.S. Appl. No. 12/356,761, Nov. 18, 2014, 4 pages.

"Non-Final Office Action", U.S. Appl. No. 12/356,761, Dec. 24, 2013, 11 pages.

"Non-Final Office Action", U.S. Appl. No. 12/356,761, Feb. 25, 2011, 8 pages.

"Non-Final Office Action", U.S. Appl. No. 13/013,274, Sep. 19, 2014, 20 pages.

"Notice of Allowance", U.S. Appl. No. 12/274,235, Sep. 16, 2011, 6 pages.

"Notice of Allowance", U.S. Appl. No. 13/477,664, Jun. 27, 2014, 6 pages.

"Restriction Requirement", U.S. Appl. No. 12/356,761, Sep. 4, 2014, 5 pages.

"X86 Disassembly/Functions and Stack Frames", Retrieved from <http://en.wikibooks.org/w/index.php?title=X86_Disassembly/Functions_and_Stack_Frames&oldid=840982> on Apr. 13, 2014, Apr. 23, 2007, 5 pages.

Balakrishnan,"The Impact of Performance Asymmetry in Emerging Multicore Architectures", In Proceedings of ISCA 2005, 2005, 12 pages.

Constantinou,"Performance Implications of Single Thread Migration on a Chip Multi-Core", ACM SIGARCH Computer Architecture News, vol. 33 Issue 4, Nov. 2005, 12 pages.

Kumar,"A Multi-Core Approach to Addressing the Energy-Complexity Problem in Microprocessors", In Proceedings of WCED 2003, Jun. 2003, pp. 1-8.

Kumar,"Single-ISA Heterogeneous Multi-Core Architectures: The Potential for Processor Power Reduction", In Proceedings of MICRO-36 2003, 2003, 12 pages.

Magnusson,"Understanding stacks and registers in the Sparc architecture(s)", Retrieved from <http://web.archive.org/web/20071020054930/http://www.sics.se/~psm/sparcstack.html> on Apr. 15, 2014, Mar. 1997, 9 pages.

"Final Office Action", U.S. Appl. No. 12/356,761, filed Mar. 4, 2015, 9 pages.

* cited by examiner

SWITCHING TASKS BETWEEN HETEROGENEOUS CORES

RELATED APPLICATIONS

This present disclosure claims priority to U.S. Provisional Patent Application Ser. No. 61/531,544 filed Sep. 6, 2011, and U.S. Provisional Patent Application Ser. No. 61/676,482 filed Jul. 27, 2012, the disclosures of which are incorporated by reference herein in their entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Ever-increasing user expectations for high performance and increased feature sets have led to the inclusion of multi-core processors in most computing devices. These multi-core processors often enable mobile or low-power computing devices to perform tasks once reserved for full-power desktop computers or servers. Mobile or low-power computing devices, however, are often limited in an amount of power they may consume (e.g. battery life or thermal considerations). An amount of power consumed to perform these tasks may vary as the tasks range from low complexity (e.g., audio playback) to high complexity (e.g., video editing or streaming). Low complexity tasks can often be executed by a simple processor core (e.g. a core with a limited instruction set) that consumes a small amount of power while high complexity tasks are often executed using one or more complex processor cores (e.g. cores with full instruction sets) that consume large amounts of power.

SUMMARY

This summary is provided to introduce subject matter that is further described below in the Detailed Description and Drawings. Accordingly, this Summary should not be considered to describe essential features nor used to limit the scope of the claimed subject matter.

A method is described for determining that a task being executed by a first core of a processor can be executed by a second core of the processor, the first core having a first instruction set that is different from a second instruction set of the second core, and switching execution of the task from the first core to the second core effective to decrease an amount of energy consumed by the processor.

Another method is described for initiating an application via a first operating system, the application and the first operating system executed by a first core of a processor, rendering, via the first operating system, a user interface of the application, determining when at least part of the application can be executed using a second operating system, switching, responsive to the determining, execution of the at least part of the application from the first core to the second core, and rendering, via the second operating system, content associated with the at least part of the application.

A system is described that includes a processor and a task switcher that is configured to determine that a task being executed using first software of a first core of the processor can be executed using a second software of a second core of the processor, transmit an indication of a core switch to an application to which the task belongs, receive, from the application, one or more potential switch points at which the task can be switched to the second core for execution using the second software, and switch, at one of the potential switch points, execution of the task from the first software of the first core to the second software of the second core effective to reduce an amount of energy consumed by the cores and/or system.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Conventional multi-core architectures may permit tasks to be moved between similar cores, but not cores of different types or executing different software. Thus, a low complexity task executing on a high performance core cannot be moved to a low performance core having a different instruction set while executing. This can lead to inefficient computing (e.g., reduced batter run-time or higher operating temperatures) as tasks executable by a simple processor core continue to execute on a complex processor core that may have a higher current leakage, operating frequency, and/or power consumption.

This disclosure describes apparatuses and techniques for switching tasks between heterogeneous cores of a processor, which execute different instruction sets, have different levels of performance, and/or consume differing amounts of power. Tasks may be switched from a high-performance core to a lower-performance core that consumes less energy while executing the tasks. By so doing, usage of the high power-high performance core may be reduced, thereby decreasing an amount of energy consumed by the cores.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
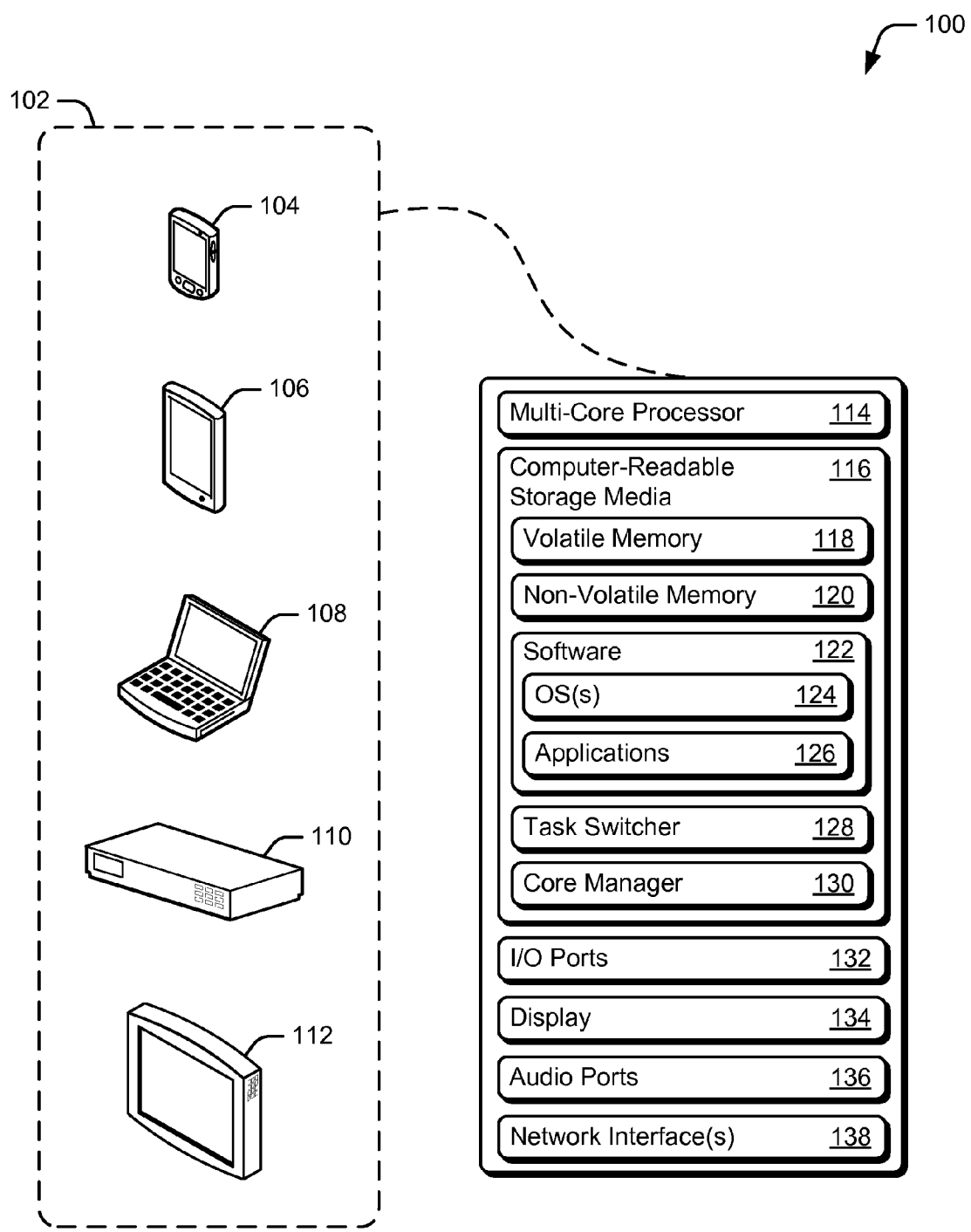
FIG. 1 illustrates an operating environment having computing devices in accordance with one or more aspects.

FIG. 1 illustrates an example of an operating environment 100 having computing devices 102, each of which are capable of communicating, accessing, or processing various data. Computing devices 102 include smart-phone 104, tablet computer 106, laptop computer 108, and set-top box 110, and touch-input-enabled thermostat 112 (thermostat 112). Although not shown, other configurations of computing devices 102 are also contemplated such as a desktop computer, server, mobile-internet device (MID), gaming console, internet-protocol-enabled television, mobile hotspot, networked media player, and so on.

Each Computing device 102 includes multi-core processor 114 (e.g. an applications processor) and computer-readable storage media 116 (CRM 116). Multi-core processor 114 may include any suitable number of processing cores (hereinafter referred to as 'cores' for brevity), which may be configured in a variety of manners as described in greater detail below. CRM 116 includes volatile memory 118 and non-volatile memory 120. Volatile memory 118 may include any suitable type of memory such as random-access memory (RAM), synchronous or asynchronous dynamic RAM (DRAM), static RAM (SRAM), double-data-rate RAM (DDR) and the like.

Non-volatile memory 120 may include any suitable memory or storage device such as non-volatile RAM (NVRAM), read-only memory (ROM), Flash memory, magnetic or optical storage drives, and the like. Software 122 of computing device 102, which may include operating system(s) 124 (OSs 124) and applications 126 may be stored by volatile memory 118, non-volatile memory 120, or any suitable type of CRM 116. Alternately or additionally, OSs 124 and/or applications 126 may be embodied as firmware or other types of processor-executable instructions or code. OSs 124 are executed by multi-core processor 114 to manage hardware resources of computing device 102 and provide services or hardware access to applications 126.

Applications 126 enable users to interact with data stored by, or accessible to, computing device 102. For example, applications 126 may enable a user of computing device 102 to access email, search the internet, listen to audio files, watch or create video content, play games, stream online content, communicate with users of computing devices 102 (e.g., via text, voice, or video), and so on. Functionalities of each application 126 may correspond to one or more tasks, which are responsible for performing a respective functionality. For example, a media player application may include a task for rendering and managing a user interface presented via display 134. The media player application may include another task for decoding and playing a stream of video via the user interface.

CRM 116 also includes task switcher 128 and core manager 130. Although shown here as embodied on CRM 116, some functionality of task switcher 128 and/or core manager 130 may also be implemented via firmware or hardware (not shown). Task switcher 128 is capable of switching execution of a task from one core of multi-core processor 114 to another core of multi-core processor 114. Core manager 130 may profile current or expected use of cores of multi-core processor 114 and may initiate an event to cause task switcher 128 to switch execution of a task between different cores. How task switcher 128 and core manager 130 are implemented and used varies and is described below.

Computing device 102 may also include I/O ports 132, display 134, audio ports 136, and network interface(s) 138. I/O ports 132 allow computing device 102 to interact with other devices or users. I/O ports 132 may include any combination of internal or external ports, such as USB ports, Serial ATA (SATA) ports, PCI-express based ports or card-slots, and/or other legacy ports. Various peripherals may be operatively coupled with I/O ports 132, such as human-input devices (HIDs), external computer-readable storage media, or other peripherals.

Display 134 may include an integrated display of computing device 102 or an external display with which computing device 102 is associated. Display 134 may include a touch-input sensor (not shown), such as a touch screen or touch-sensitive overlay. Generally, display 134 presents a user interface or rendered graphics associated with OSs 124 or applications 126. Audio ports 136 may include audio input or output ports (e.g., earphone jacks or docking connectors) enabling computing device 102 to play or record sound. In some aspects, audio ports 136 may be operably coupled with a microphone or speakers integrated with computing device 102.

Network interface(s) 138 provides connectivity to one or more networks and other devices connected therewith. Data communicated over network interfaces 138 may be packetized or framed depending on a communication protocol or standard by which computing device 102 is communicating. Network interfaces 138 may include wired interfaces, such as Ethernet or fiber optic interfaces for communication over a local network, intranet, or the Internet. Network interfaces 138 may also include wireless interfaces that facilitate communication over wireless networks, such as wireless LANs, cellular networks, or wireless personal-area-networks (WPANs).

Figure 2:
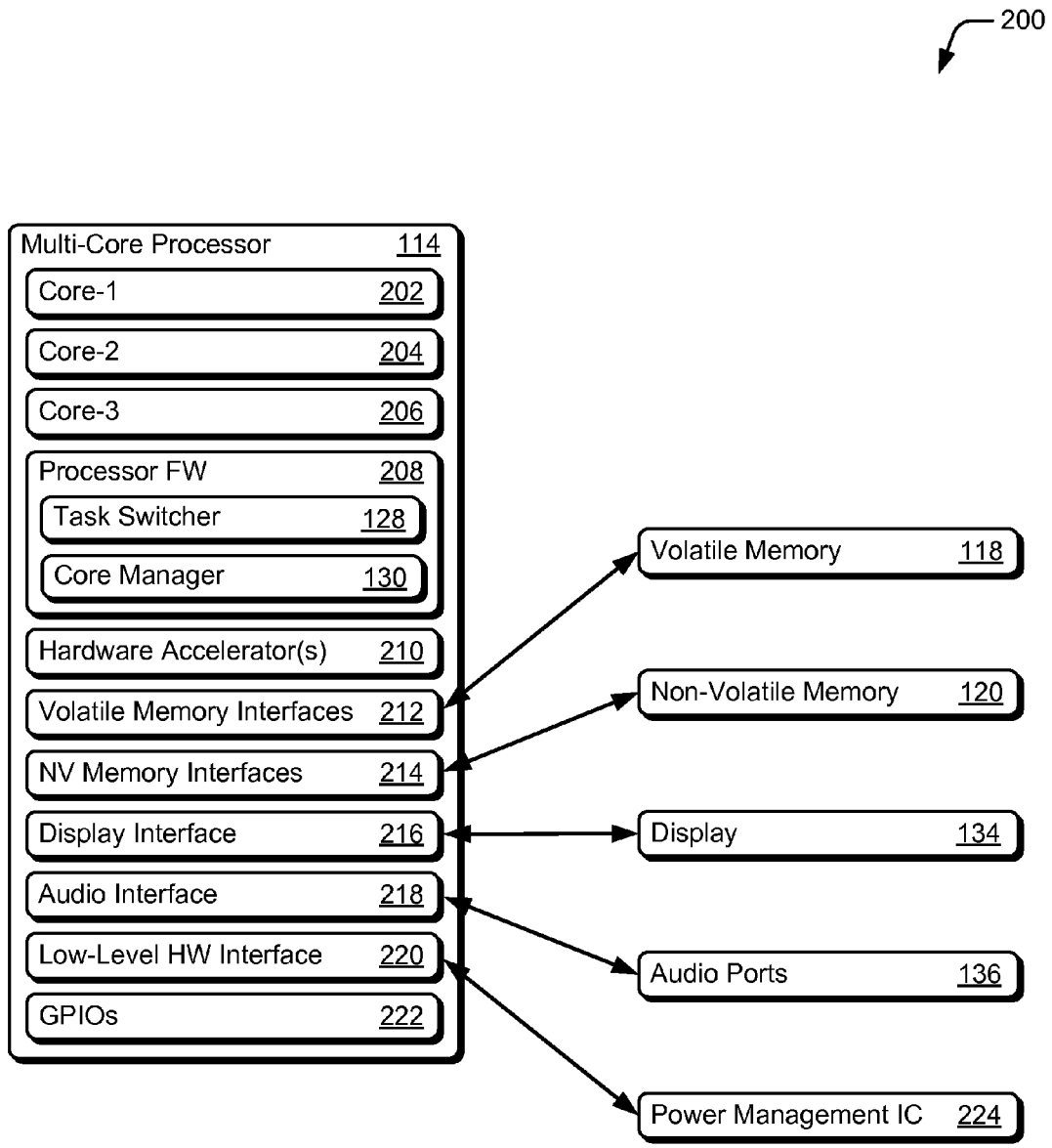
FIG. 2 illustrates an example of a multi-core processor of FIG. 1 in accordance with one or more aspects.

FIG. 2 illustrates an example of multi-core processor 114 generally at 200. Multi-core processor 114 includes heterogeneous processor cores (e.g., cores supporting different instruction sets or software), shown here as processor core-1 202 (core-1 202), processor core-2 204 (core-2 204), and processor core-3 206 (core-3 206). Each core of multi-core processor 114 may be configured differently, such as supporting different levels of performance, different instruction sets, and/or different software (e.g., operating systems).

By way of example only, consider the following configurations for the heterogeneous cores of multi-core processor 114. Core-1 202 may be configured as a high performance core (e.g., Advanced RSIC Machine (ARM) Advanced Cortex A9 core). Core-2 204 may be configured as a medium performance core (e.g., ARM real-time (ARM-R) core). Core-3 206 may be configured as a low performance core (e.g., ARM microcontroller (ARM-M) core). Additional cores of multi-core processor 114 may be similar or different depending on an intended application or use. For example, multi-core processor 114 may be configured as a four, six, or eight core processor having pairs of similar processor cores.

In the context of the present example, core-1 202 may operate over a frequency range of approximately 100 MHz to 1 GHz consuming approximately 2.3 mA/MHz during active states. Core-1 202 may also support a 64-bit or 32-bit instruction set or be configured to perform complex arithmetic operations, such as floating point operations.

Core-2 204 may support a subset of a full 32-bit or 16-bit instruction set (e.g., a thumb instruction set) and operate over a frequency range of approximately, 10-200 MHz. When active or idle, core-2 204 may also have lower leakage current or consume less energy than core-1 202.

Core-3 206 may support a set of 16-bit or 8-bit instructions and operate over a frequency range of approximately 5-100 MHz consuming about 66 µA/Mhz during active states. When active or idle, core-3 206 may also have lower leakage current or consume less energy than core-2 204.

Multi-core processor 114 may also include processor firmware 208 (processor FW 208), which may be stored on any suitable type of memory (e.g., ROM or EEPROM). Processor FW 208 may include, in part or whole, task switcher 128 or core manager 130, which are described in greater detail below. In this particular example, task switcher 128 and core manager 130 are implemented when processor firmware 208 is executed by one of the cores of multi-core processor 114.

Multi-core processor 114 may also include hardware accelerator(s) 210, volatile memory interfaces 212, and non-volatile memory interfaces 214 (NV memory interfaces 214). Hardware accelerators 210 may include video or audio hardware accelerators that are configured to decode, decompress, or render video or audio content via hardware. Alternately or additionally, hardware accelerators 210 may be configured to capture, compress, or encode audio or video content via hardware. Hardware accelerators 210 can improve performance of multi-core processor 114 by reducing a number of computational cycles needed to perform a task. For example, packets of video data can be directed to hardware accelerators 210 for decoding, instead of decoding the packets by repetitively executing a series instructions with core-1 202. Volatile memory interfaces 212 (e.g., DDR controller) and NV memory interfaces 214 (e.g., Flash controller) enable any core of multi-core processor to access volatile memory 118 and non-volatile memory 120 respectively.

Multi-core processor 114 may also include display interface 216, audio interface 218, and low-level hardware interface 220 (low-level HW interface 220). Display interface 216 may be any suitable interface to an integrated or external display, such as a liquid crystal display (LCD) interface, low-voltage differential signaling interface (LVDS), Display Port, high-definition multimedia interface (HDMI), digital video interface (DVI), and so on. Audio interface 218 may be any suitable interface to an external audio circuit or audio port, such as an inter-integrated circuit sound ($I^2S$) interface or an audio codec specific interface (AC-97).

Low-level HW interface 220 enables multi-core processor 114 to communicate with housekeeping controllers such as power supplies, temperature controllers, fan controllers, clock generators, and the like. Low-level HW interface 220 may communicate via an inter-integrated circuit ($I^2C$) bus, system management bus, serial peripheral interface bus, one-wire bus, and the like. Display interface 216, audio interface 218, and low-level HW interface 220 permit any core of multi-core processor 114 to communicate with display 134, audio ports 136, and power management integrated-circuit 224 (power management IC 224) respectively.

General purpose input/outputs 222 (GPIOs 222) of multi-core processor 114 provide connectivity to low level hardware, such as light-emitting diodes (LEDs) or hardware switches (not shown). For example, GPIOs 222 can receive user interaction with a power button of computer device 102 or indicate alerts or a status via LEDs of computer device 102. Any of the cores of multi-core processor 114 can access or control GPIOs 222.

Figure 3:
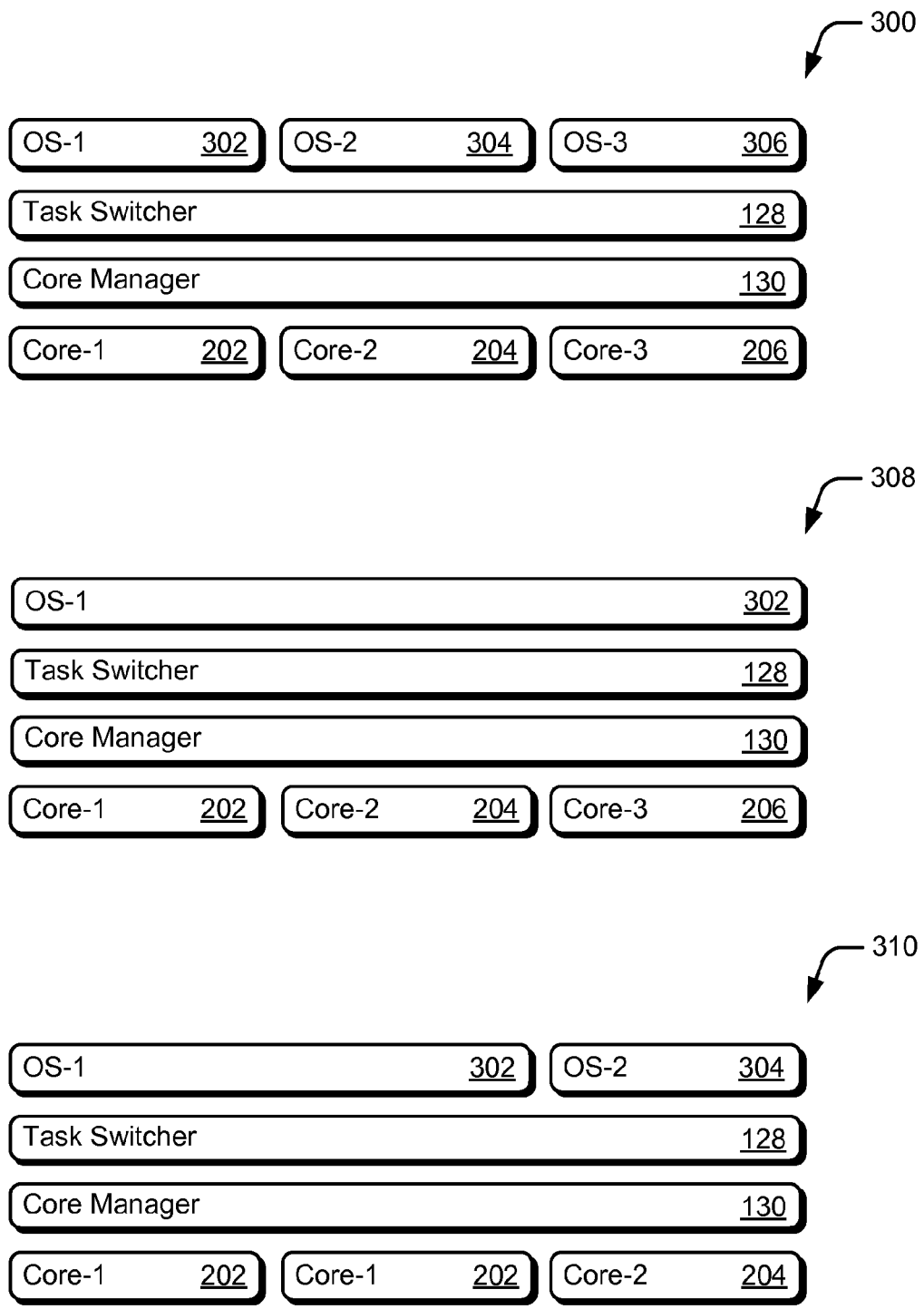
FIG. 3 illustrates one or more stack architectures in accordance with one or more aspects.

FIG. 3 illustrates example stack architectures, each of which include heterogeneous cores and one or more operating systems. These stack architectures show various operating system (OS) configurations that can be implemented using heterogeneous cores. Stack architecture 300 includes operating system 1 302 (OS-1 302), operating system 2 (304), and operating system 3 306 (OS-3 306). Although illustrated as operating systems, OS-1 302, OS-2 304, or OS-3 306 may represent any suitable type or combination of software and/or firmware that enables applications of computing device 102 to execute on a respective core.

Each of these operating systems may be different from the others or configured for execution by a particular core. For example, OS-1 302 may be a full-featured OS, OS-2 304 may be a real-time OS, and OS-3 306 may be a micro OS or firmware. Accordingly, each OS may be configured to execute via an instruction set supported by a core on which each respective OS executes. OS-1 302, OS-2 304, or OS-3 306 may be associated with one or more software providers, such as Android (e.g. Honeycomb or Ice Cream Sandwich), Microsoft (e.g., Windows Phone), Linux, and so on. For instance, OS-1 302 may be a full-featured Android OS, OS-2 304 may be a Lite-Android OS, and OS-3 306 may be function of Android implemented on microcontroller code.

In this particular example, each operating system is executed by a corresponding core which is shown directly below the respective operating systems. In this particular example, OS-1 302 (full-featured OS) can be executed by core-1 202 configured as a high performance core, OS-2 304 (real-time OS) can be executed by core-2 204 configured as a real-time core, and OS-3 306 (micro OS) can be executed by core-3 206 configured as a microcontroller core. Here, task switcher 128 and core manager 130 act as intermediaries between the cores and the operating systems enabling tasks executing from one operating system/core set (e.g., OS-1 302 and core-1 202) to be switched to a different operating system/core set (e.g., OS-2 304 and core-2 204).

Stack architecture 308 includes OS-1 302 configured for execution by core-1 202, core-2 204, and core-3 206. Core-1 202, core-2 204, and/or core-3 206 may be implemented as cores of a multi-core processor, as separate cores of multiple processors, or any suitable combination thereof. In this particular example, OS-1 302 may be a full-featured OS with an array of applications. Some of these applications, however, may not need to run on a high performance core, such as core-1 202. In some cases, functions of these applications can be switched to lower performance cores for execution (e.g., core-2 204 or core-3 206). Even though core-2 204 or core-3 206 may be lower performance cores or have fewer features than core-1 202, they are able to execute OS-1 302 and execute some functions of the applications executed by core-1 202. In this particular example, code for the application can be compiled using a lowest common denomination instruction set for cores 202-206. In some cases, switching execution of various tasks or functions to lower performance cores can reduce an amount of energy consumed by the processor.

Stack architecture 310 includes OS-1 302 and OS-2 304, which are configured as a full-featured OS and a real-time OS respectively. Here, the stack architecture includes two high performance cores (core-1 202) and one real-time core (core-2 204). In this particular example, applications of OS-1 302 can be executed with either of both high performance cores. This can be useful when applications of OS-1 302 create a high level of computational demand on multi-core processor 114. When the level of computational demand on multi-core processor 114 falls, however, applications or tasks of OS-1 302 may be switched to OS-2 304 and core-2 204 for execution. This may permit the high performance cores to be idled or sent to a lower power state (e.g. sleep or powered down). By so doing, energy typically consumed by current leakage in the high performance cores can be conserved.

These are but a few examples of stack architectures that permit task switching between heterogeneous cores (e.g., cores with differing instruction sets). Any of the example OS or core configurations described may be further combined, interposed, reduced, expanded, or modified without departing from the various aspects described herein.

Figure 4:
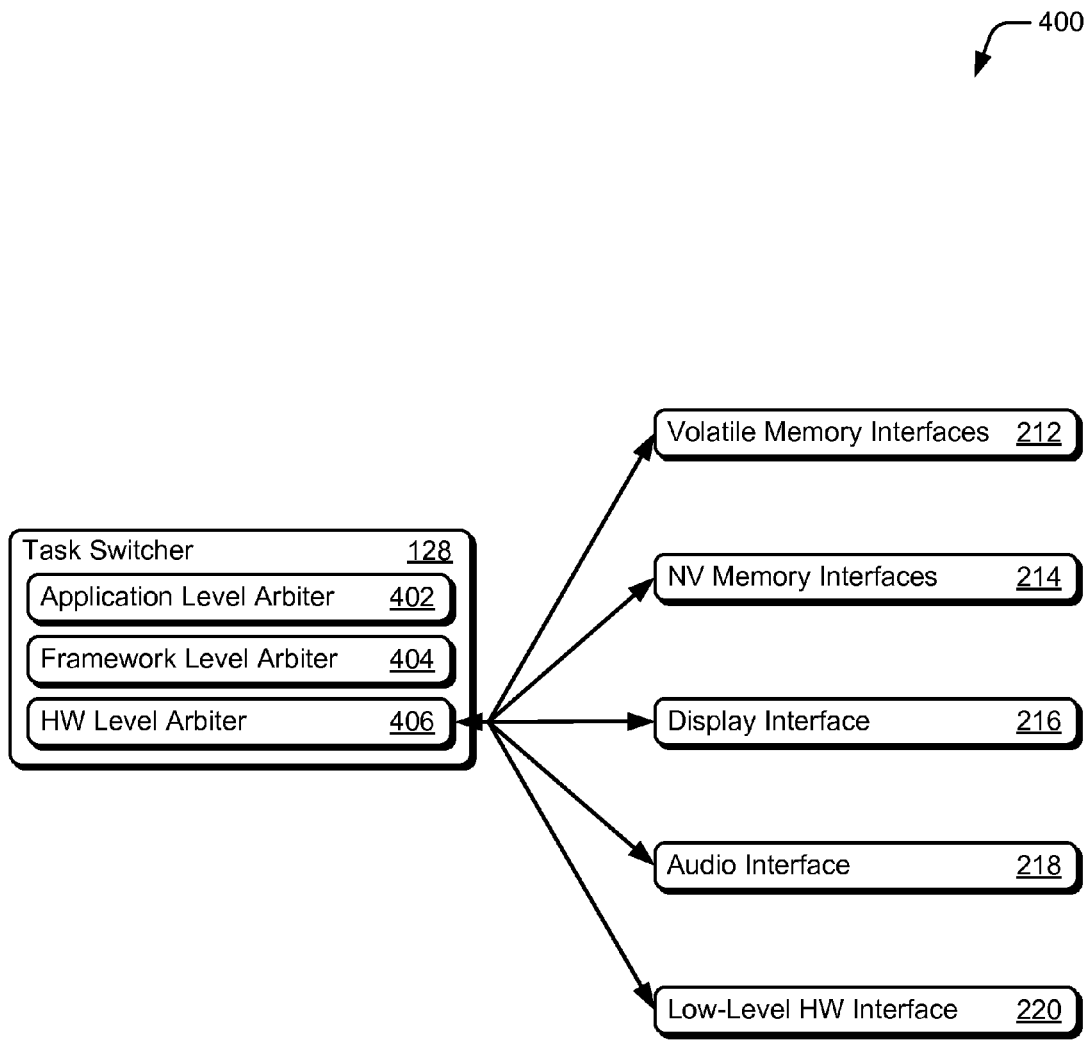
FIG. 4 illustrates a task switcher of FIG. 1 in accordance with one or more aspects.

FIG. 4 illustrates an example of task switcher 128 that includes arbiters for switching tasks between cores. These arbiters enable task switcher 128 to monitor and support handshake operations as tasks are switched from one core to another. Task switcher 128 includes application level arbiter 402, framework level arbiter 404, and hardware level arbiter 406.

Application level arbiter 402 tracks progress of rendering tasks associated with applications. This may include tracking, storing, or transferring a current point of progress associated with a rendering task of an application. For example, application level arbiter 402 may track progress of a task for rendering a user interface of an application. Further, application level arbiter 402 may receive, store, or transfer potential task switch points from an application with which the task is associated.

Framework level arbiter 404 provides a middleware level interface for switching tasks between cores. The middleware level may include data structures associated with a task such as memory buffers or parameters associated with the memory buffers. For example, framework level arbiter 404 may track, store, or transfer information associated with a memory buffer's allocation, state, status flags, or thresholds. This information may be used by a core to which a task is being switched to start execution of the task. Framework level arbiter 404 may also maintain a task switch point until a task is switched to another core, or enable the task to resume on a previous core in the event that the task switch to the other core fails. Generally, framework level arbiter 404 prevents interruptions to a user's computing experience by ensuring a smooth transition of a task's execution from one core to another.

HW level arbiter 406 supports task switching between cores at the hardware level. This may include tracking, storing, or transferring information associated with various peripherals, buses, components, interrupts, and the like. In this particular example, HW level arbiter 406 communicates and interacts with volatile memory interfaces 212, NV memory interfaces 214, display interface 216, audio interface 218, and low-level HW interface 220. This permits tasks accessing these components to be switched between various cores of multi-core processor 114.

HW level arbiter 406 may also set interrupt routing and monitor core performance of multi-core processor 114. Monitoring the core performance may include monitoring thresholds for computational demand on the cores, performance levels of the cores, core optimization, and the like. For example, HW level arbiter 406 may monitor a core selected to perform a task, determine if the core is optimized for the task (e.g., optimal frequency/voltage settings), and prepare for a task switch to another core if the selected core is not the optimal core for the task.

Techniques of Switching Tasks Between Heterogeneous Cores

The following discussion describes techniques of switching tasks between heterogeneous cores. These techniques can be implemented using the previously described environments or entities, such as task switcher 128 or core manager 130 of FIG. 1 embodied on a computing device 102. These techniques include methods illustrated in FIGS. 5, 7, and 8, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIGS. 2-4 by way of example. Such reference is not to be taken as limited to operating environment 100 but rather as illustrative of one of a variety of examples.

Figure 5:
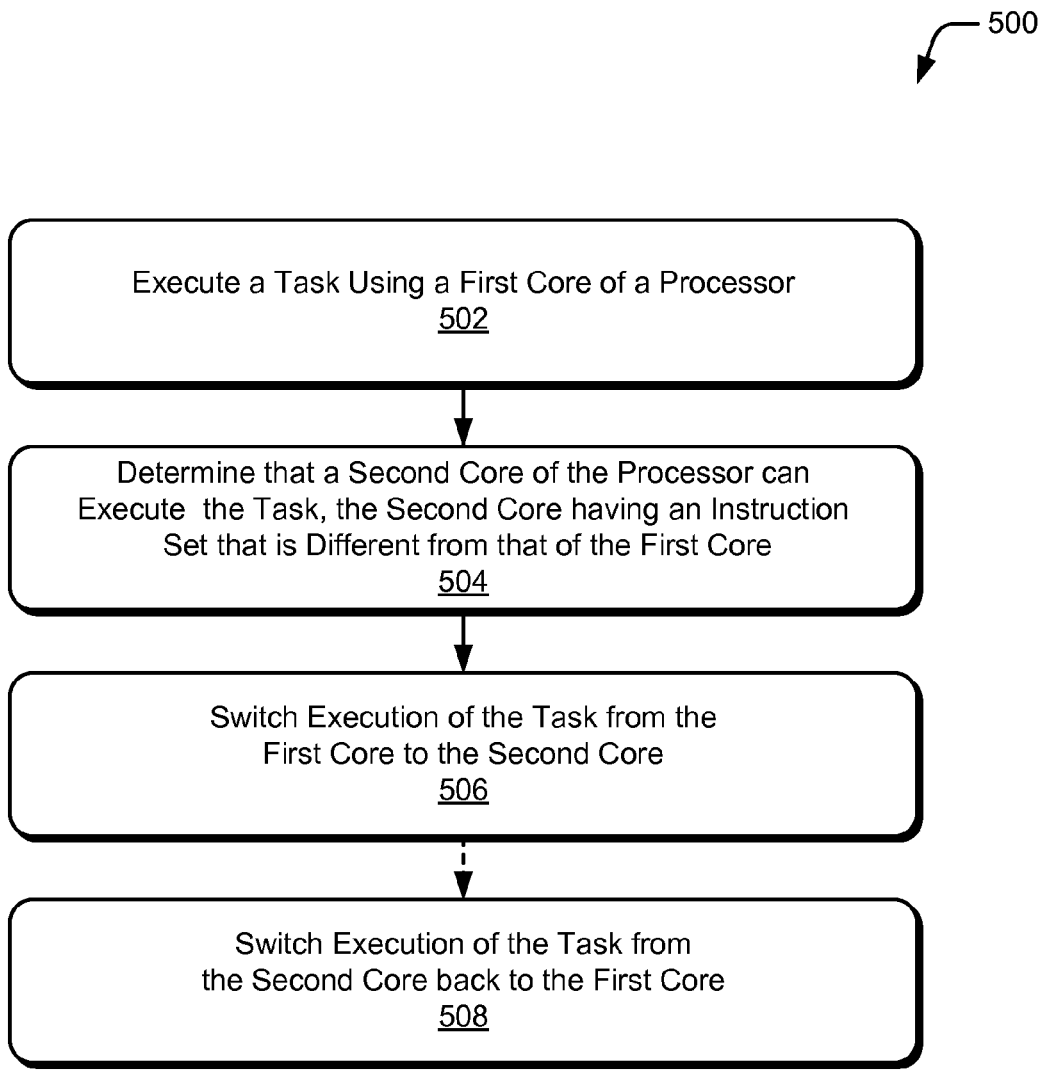
FIG. 5 illustrates a method of switching execution of a task from a first core of a processor to a second core of the processor.

FIG. 5 depicts a method 500 for switching execution of a task from a first core of a processor to a second core of the processor, including operations performed by task switcher 126 of FIG. 1.

At 502, a task is executed using a first core of a processor. The task may be part of an application executed by the first core of the processor. The first core of the processor may support a particular instruction set that is different from those of other cores of the processor. The processor may be a multi-core processor that includes two or more heterogeneous cores, such as those described above. The first core may be a high performance core (e.g. ARM-A) of the processor. Alternately or additionally, the first core of the processor may execute an operating system, such as a full-featured operating system.

Figure 6:
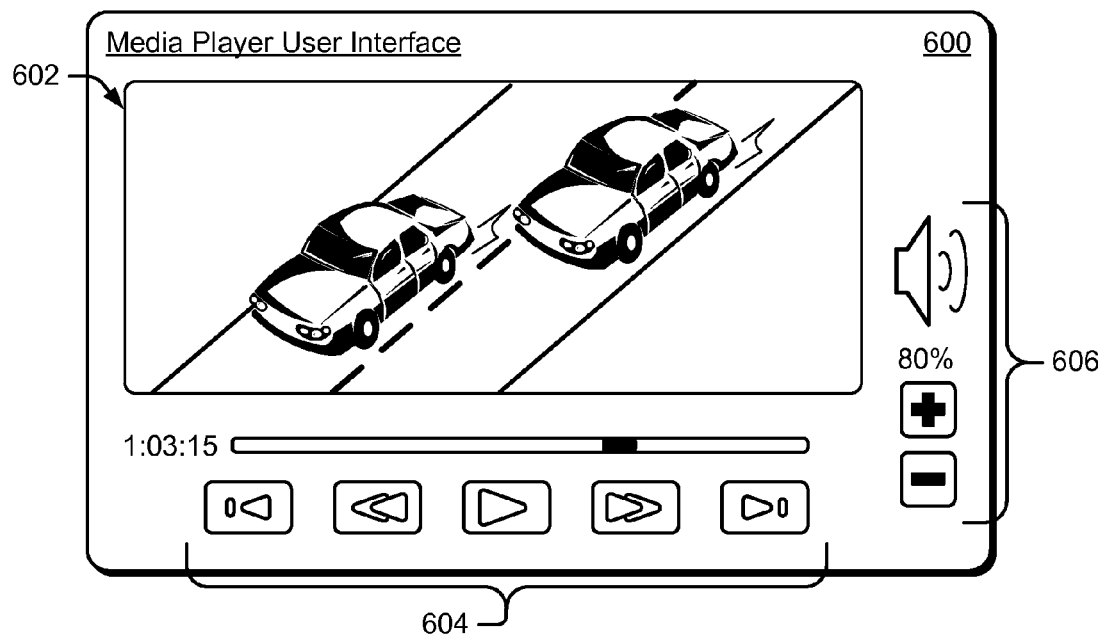
FIG. 6 illustrates an example user interface in accordance with one or more aspects.

As an example, consider a user initiating a media player application with smart-phone 104 of FIG. 1. Assume here that smart-phone 104 is configured with stack architecture 300. Here, the media player application is launched via OS-1 302 (e.g., a full-featured Android OS) being executed by core-1 202 (e.g., an ARM-A core). Core-1 202 then executes the video application to render media player interface 600 (media player UI 600) as illustrated in FIG. 6. Media player UI 600 includes video area 602, playback controls 604, and volume controls 606. Once rendered, media player UI 600 is presented to display 134 of smart-phone 104 via display interface 216.

Assume here that the user initiates playback of a video by interacting with playback controls 604. Core-1 202 then executes the media player application to render video for display to video area 602. This includes routing packets of video data from network interface 138 to hardware accelerators 210 for decoding, decompression, and rendering. The rendered video data is then routed to display interface 216 for communication to display 134 for display in video area 602.

At 504, it is determined that a second core of the processor (or another processor) can execute the task executed by the first core of the processor. The second core of the processor may support an instruction set that is different from the instruction set of the first core of the processor. The determination may be performed by profiling a usage of the first core (e.g., a core currently selected for executing software) and a level of performance needed by a system in which the processor is implemented. For example, if a high performance core is not being used heavily by a task and system performance needs are low, a lower performance core may be able to execute the task without compromising performance.

In the context of the present example, core manager 130 profiles core-1 202 to determine a level of usage and a level of performance needed for smart-phone 104. Here assume that core-1 202 is executing the media player application to render the video, as well as some background tasks to manage lower-level functions of smart-phone 104. Core manager 130 determines that core-1 202 is not under heavy load and that the level of performance needed by smart-phone 104 can be met by core-2 204 (e.g., a real-time core). Assume that core-2 204 is configured to execute a real-time OS, such as a Lite-Android OS. Here, core manager 130 may initiate a command or indication to task switcher 128 to switch execution of the media player application to core-2 204.

At 506, execution of the task is switched from the first core of the processor to the second core of the processor. In some cases, the task is switched from the first core of the processor to a second core of another processor. Switching the task to the second core may be effective to decrease an amount of energy consumed by the processor. For example, execution of the task may be switched from a high performance core to a medium performance or low performance core that consumes less energy to execute the task.

Continuing the ongoing example, task switcher 128 switches execution of the media player application from core-1 202 to core-2 204. Assume here that task switcher 128 queries the media player application for a set of potential switch points prior to the switch. Task switcher 128 then analyzes activity of entities involved with rendering the video data of media player application, such as network interface 138, hardware accelerators 210, and display interface 216.

Once an acceptable switch point is chosen, task switcher 128 generates state information for software, firmware, and hardware necessary to switch execution of the media player application from core-1 202 to core-2 204. This may be accomplished with application level arbiter 402, framework level arbiter 404, and HW level arbiter 406. This state information is then used to switch execution of the media player application to core-2 204. Here, assume that core-2 204 executes media player application to continue routing video data from network interface 138 to hardware accelerator 210 for rendering. The work required to route the video data through hardware accelerator 210 may be minimal, which allows core-2 204 to execute the media player application even though core-2 204 is not a high performance core. By so doing, energy typically consumed by leakage current of a high performance core can be conserved.

Optionally at 508, execution of the task is switched from the second core of the processor (or other processor) back to the first core of the processor. This may be responsive to receiving user input or an event, such as an alert for an incoming call, incoming text message, email, alarm, and so on. In some cases, this is effective to enable the task respond to the received user input or event. For example, the task may be unable to respond while being executed by the second core due to the limited features of the second core. By transferring the task back to the first processor core, the task can take advantage of the features of the first core to respond to the event.

Concluding the present example, assume that the user of smart-phone 104 interacts with playback controls 604 to pause playback of the video. Here, the media player application when executed by core-2 204 may not be able to respond to the user input. Core manager 130, however, monitors the performance of core-2 204 and signals an event to task switcher 128 indicating a need to switch execution of the application from core-2 204 back to core-1 202. Task switcher 128 then switches execution of the media player application from core-2 204 back to core-1 202.

Figure 7:
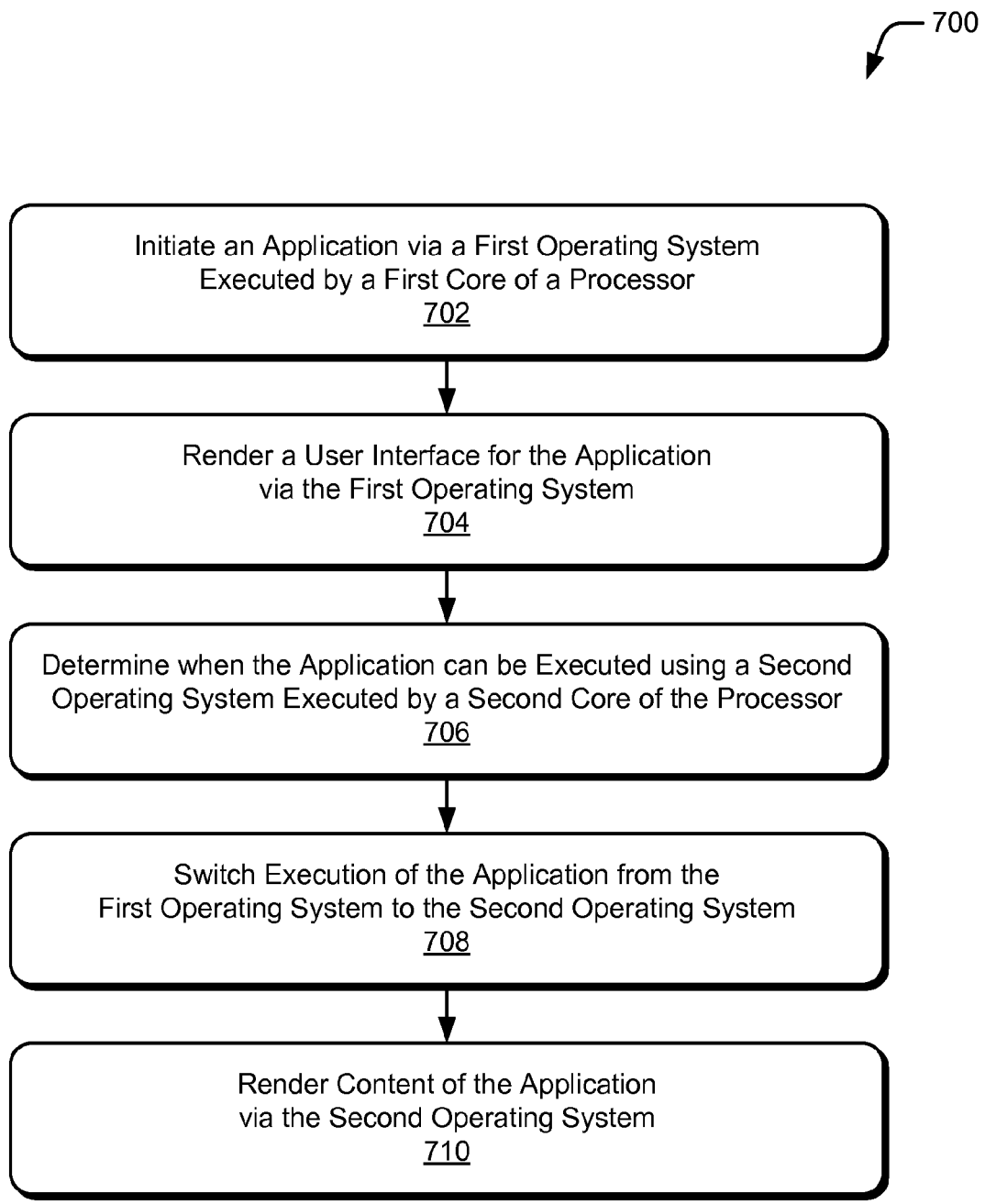
FIG. 7 illustrates a method of switching part of an application from a first core of a processor to a second core of the processor.

FIG. 7 depicts a method 700 for switching an application from a first core of a processor to a second core of the processor, including operations performed by task switcher 128 or core manager 130 of FIG. 1.

At 702, an application is initiated via a first operating system executed by a first core of a processor. The processor may be a multi-core processor having multiple heterogeneous cores, which support differing instruction sets or operating systems. The application may include one or more tasks for performing different functions of the application, such as rending graphics, receiving user input, rendering content, and so on.

As an example, consider method 700 in the context of a user of smart-phone 104 playing of an audio file. Returning to the example of the media player application illustrated in FIG. 6, assume that the user initiates the media player application. Here, the media player application starts running on OS-1 302 (e.g., a full-featured OS) being executed by core-1 202 (e.g., a high performance core).

At 704, a user interface for the application is rendered via the first operating system. The user interface may be rendered using software or hardware accelerators. Rendering the user interface may be performed by a task of the application executing on the first core of the processor. The user interface may include any suitable features, such as visually perceptible controls or areas for displaying rendered graphics, text, video, and so on.

In the context of the present example, media player UI 600 is rendered while the media player application runs on OS-1 302 and core-1 202. Core-1 202 offloads most of the rendering to hardware accelerator 210. Once rendered, media player UI 600 is displayed via display interface 216. Audio data for playback is then routed from non-volatile memory 120 to a digital signal processor (DSP) of hardware accelerator 210 for digital to analog conversion. The converted analog audio signal is then transmitted to audio ports 136 via audio interface 218 for playback to the user. Also assume here that once audio playback begins, display 134 of smart-phone 104 turns off precluding the need to continue rendering media player UI 600.

At 706, it is determined when the application can be executed by a second operating system. The second operating system may have fewer features or less functionality than the first operating system. The second operating system may also be configured to execute on a second core of the processor. This second core may support a different instruction set (e.g., smaller instruction set) than that of the first core. All or part of the functionality of the application may be implemented while the application is executing using the second operating system. In some cases, the application can be executed by the second operating system during periods of low computational demand. For example, the second operating system may be able to execute the application after an initialization sequence that requires a high level of computational performance.

Continuing the ongoing example, core manager 130 profiles core-1 202 to determine a level of usage and a level of performance needed for smart-phone 104. Here assume that core-1 202 is executing the media player application to render the audio, as well as some background tasks to manage lower-level functions of smart-phone 104. Core manager 130 determines that core-1 202 is not under heavy load and that the level of performance needed by smart-phone 104 can be met by core-3 206 (e.g., a microcontroller core). Assume that core-3 206 is configured to execute a microcontroller OS, such as a function of Android-based firmware. Here, core manager 130 may initiate a command or indication to task switcher 128 to switch execution of the media player application to core-3 206.

At 708, execution of the application is switched from the first operating system to the second operating system. This may include determining a switch point (or multiple potential switch points) at which execution of the application can be switched between cores underlying the respecting operating systems. This can be effective to reduce a workload on the core of the processor that executes the first operating system, thereby decreasing an amount of energy consumed by that core of the processor.

Alternately or additionally, arbiters may track and/or mark a point of the applications progress to facilitate the switch. These marked points of progress enable various handshakes to occur at an application level, framework level, or hardware level when the switch point is encountered. Once a switch point is established state information, interrupts, or cache data can be transferred to the second core of the processor enabling execution of the application to be switched to the second operating system.

Continuing the ongoing example, task switcher 128 switches execution of the media player application from core-1 202 to core-3 206. Assume here that task switcher 128 queries the media player application for a set of potential switch points prior to the switch. Task switcher 128 then analyzes activity of entities involved with rendering the audio data of media player application, such as the DSP, non-volatile memory 120, and hardware accelerators 210.

Once an acceptable switch point is chosen, task switcher 128 generates state information for software, firmware, and hardware necessary to switch execution of the media player application from core-1 202 to core-3 206. This is performed by application level arbiter 402, framework level arbiter 404, and HW level arbiter 406 at their respective application layers. Here, application level arbiter 402 stores and notifies other components of the application of the impending switch point. Framework level arbiter 404 transfers buffer allocations, buffer states, flags, and over/under-run thresholds specific to core-3 206. HW level arbiter 406 generates a list of devices for interrupt marking and defines an interrupt routing configuration for core-3 206. These configurations and information is then used to switch execution of the media player application to core-3 206.

At 710, content of the application is rendered via the second operating system. The content may be any suitable content, such as text, audio, graphics, video, and so on. In some cases, the content is presented in a portion of the user interface rendered via the first operating system. In such cases, the user interface may be maintained by the second operating system while the context is rendered. In other cases, the user interface may not require rendering, such when a display of a device is turned off during audio playback.

Concluding the present example, core-3 206 executes media player application using OS-3 306 to continue routing audio data from non-volatile memory 120 to the DSP of hardware accelerator 210 for rendering. The work required to route the audio data through the DSP may be minimal, which allows core-3 206 to execute the media player application even though core-3 206 and OS-3 306 are not configured for high performance core. By so doing, energy typically consumed by leakage current of a high performance core can be conserved.

Figure 8:
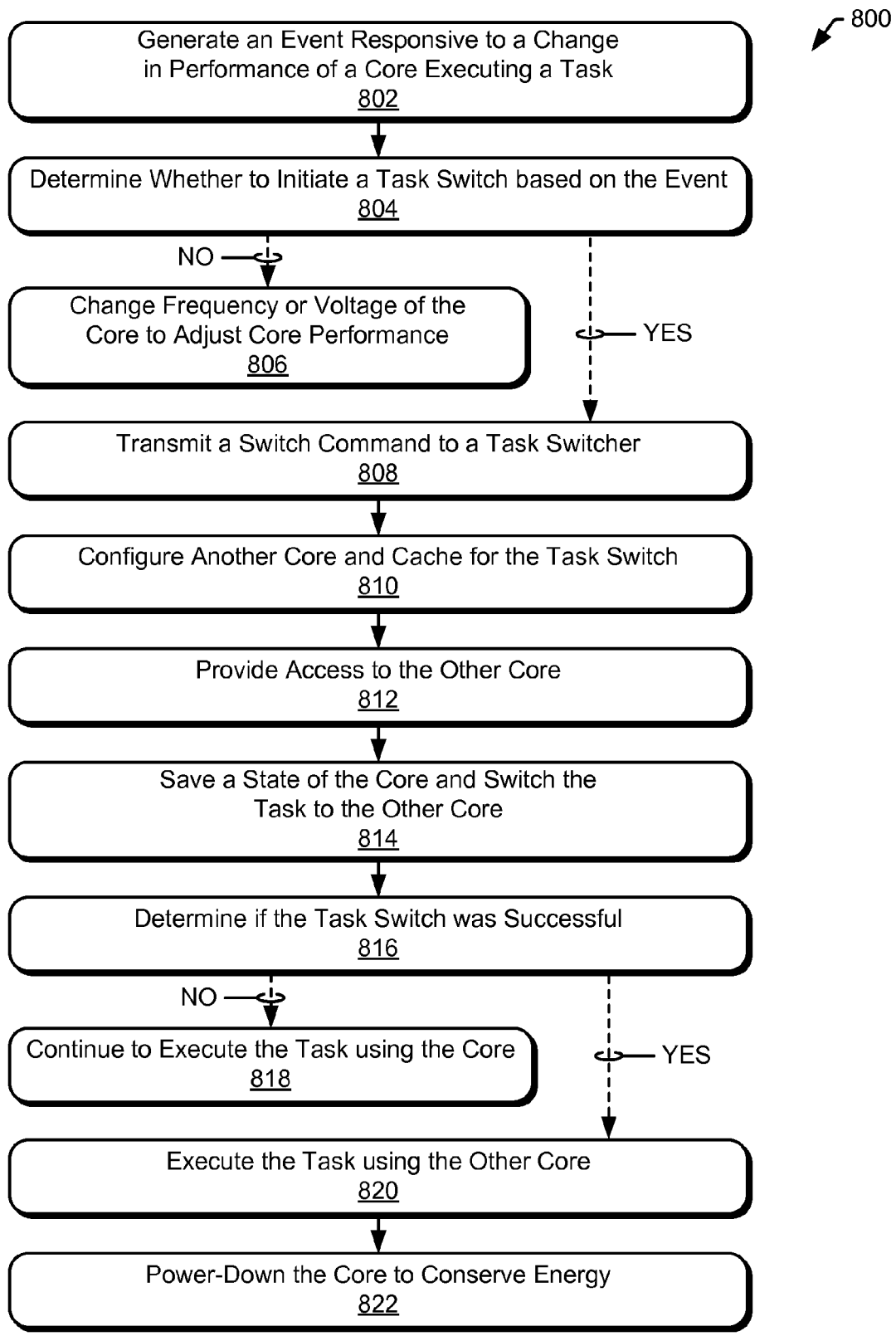
FIG. 8 illustrates a method of switching a task from a core of a processor to another core of the processor.

FIG. 8 depicts a method 800 of switching a task to another core of a processor, including operations performed by task switcher 128 or core manager 130 of FIG. 1.

At 802, an event is generated responsive to a change in performance of a core of one or more processors. The core of the processors may be executing a task or an application. The core may be associated with a cache of the processors useful for executing the task or application. The event may be generated by a core managing entity that profiles current or expected levels performance of the core.

At 804, it is determined whether to initiate a task switch to another core of the processors based on the event. The determination may also be based on a level of performance needed by a system in which the processors are implemented. For example, a core managing entity may determine if a current level of performance for a system is being met or exceeded by executing software on the core of the processors.

From operation 804, method 800 may proceed to operation 806 if a core switch is not initiated or to operation 808 if a core switch is initiated. At 806, an operational frequency or voltage of the core may be adjusted if a task switch to the other core is not initiated. This may be effective to align a level of performance of the core with a level of performance needed by the system to continue executing the task or other software with the core.

At 808, a switch command is transmitted to a task switcher. The task switcher is responsible for preparing software, firmware, or hardware stack levels for the task switch. This may include determining a switch point for the task to be switched to the other core of the processors for execution. Determining a switch point may include sending a request for potential switch point to an application to which the task belongs.

At 810, another core and another cache of the processors are configured for the task switch. Configuring the other core another cache of the processors may include powering the core or clearing stale data from the cache. The other core of the processors may support a different instruction set from that of the core. In some cases, the core and the other core implement different operating systems on which the task and other software run.

At 812, access is provided to the other core of the processors. This may include copying a context state of the core to the other core. Providing access to the other core and cache of the processors may also include transferring state information associated with execution of the task from buffers or other memory structures.

At 814, a state of the core is saved and the task switch to the other core is performed. The state of the core may include a context state, interrupts, or configuration information for the core. Alternately or additionally, data associated with the core may be saved to another memory enabling the core and the cache to be flushed and/or powered down. This saved data may then be used to restore a state of the core and the cache in the event a task switch fails to complete.

At 816, it is determined if the task switch to the other core was successful. This may include determining whether the other core is able to begin execution of the task at the switch point provided by the task switcher. A successful task switch may be unperceivable to a user as execution of the task is migrated from the core to the other core.

From operation 816, method 800 may proceed to operation 818 if the task switch was not successful or to operation 820 if the task switch was successful. At 818, execution of the task is continued with the core. Prior to continuing execution, a saved state of the core may be restored enabling execution to resume at the switch point.

At 820, the task is executed using the other core of the processors. Execution of the task by the other core starts at the switch point provided by the task switcher. An operating system or instruction set of the other core used to execute the task may be different from that of the core previously executing the task. The other core may be a lower performance-lower power core than the core on which the task was previously executed. This may be effective to decrease an amount of energy consumed by the processors to execute the task.

At 822, the core of the processors is powered-down to conserve energy. In some cases, switching the task to the other core permits the core to be powered-down. In other cases, remaining tasks of the core can be switched to the other core to enable the core to be powered-down. Powering down the core may include putting the core of the processors into an idle or sleep state that consumes a decreased amount of energy.

System-on-Chip

Figure 9:
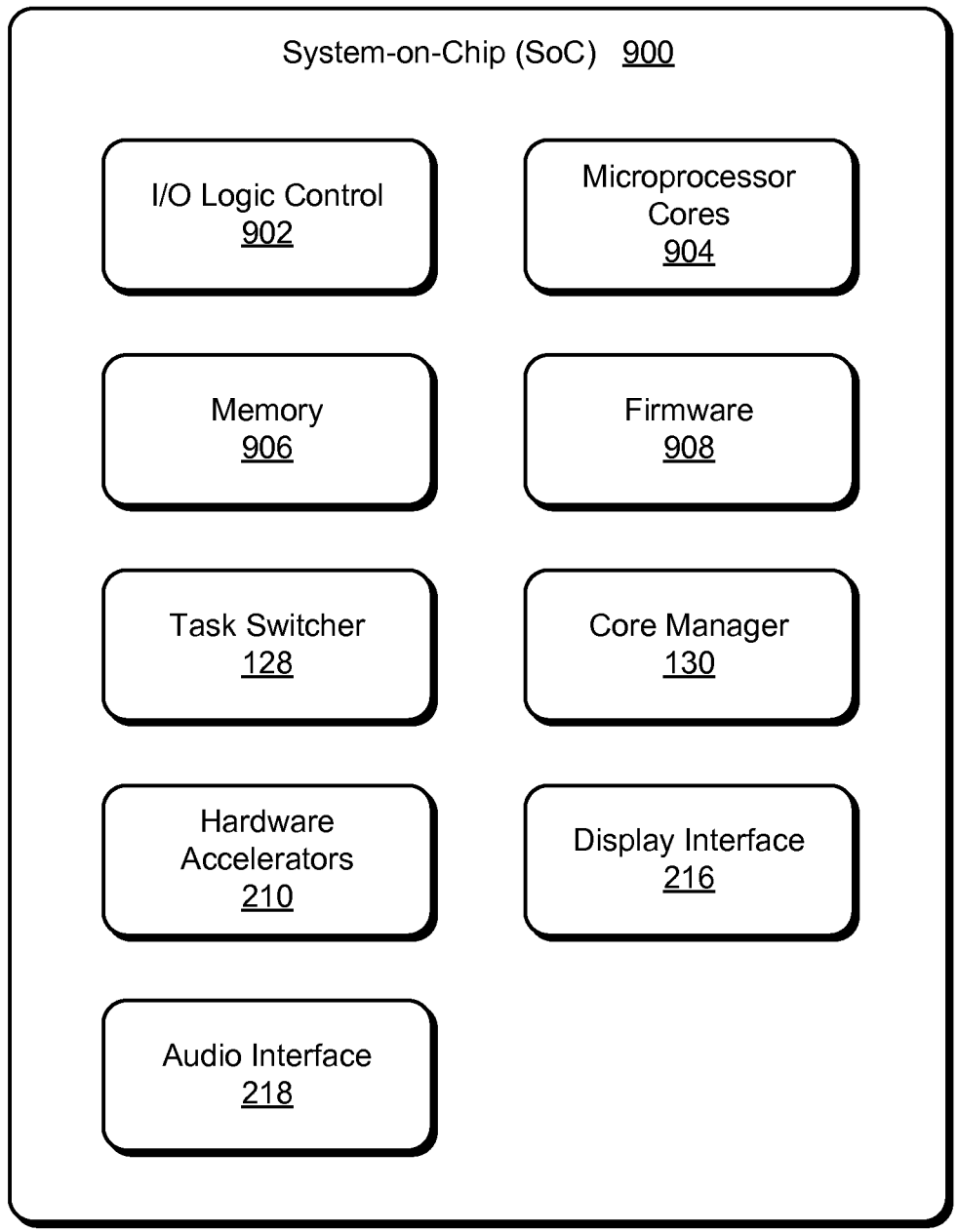
FIG. 9 illustrates a System-on-Chip (SoC) environment for implementing aspects of the techniques described herein.

FIG. 9 illustrates a System-on-Chip (SoC) 900, which can implement various embodiments described above. A SoC can be implemented in any suitable device, such as a video game console, IP-enabled television, smart-phone, desktop computer, laptop computer, access point, wireless router, cellular broadband router, tablet computer, server, network-enabled printer, set-top box, printer, scanner, camera, picture frame, home appliance, thermostat, home automation device, and/or any other type of device that may implement multi-core technology.

SoC 900 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 900 can also include an integrated data bus (not shown) that couples the various components of the SoC for data communication between the components. A wireless communication device that includes SoC 900 can also be implemented with many combinations of differing components. In some cases, these differing components may be configured to implement concepts described herein over a wireless connection, link, or interface.

In this example, SoC 900 includes various components such as an input-output (I/O) logic control 902 (e.g., to include electronic circuitry) and microprocessor cores 904 (e.g., any full-featured, real-time, or microcontroller core as described herein). SoC 900 also includes a memory 906, which can be any type and/or combination of RAM, low-latency nonvolatile memory (e.g., Flash memory), ROM, one-time programmable memory, and/or other suitable electronic data storage. Alternately or additionally, SoC 900 may comprise a memory interface for accessing additional or expandable off-chip memory, such as an external Flash memory module. SoC 900 can also include various firmware and/or software, such as a firmware 908, which can be computer-executable instructions maintained by memory 906 and executed by microprocessor 904. SoC 900 may also include other various communication interfaces and components, communication components, other hardware, firmware, and/or software.

SoC 900 includes task switcher 128, core manager 130, hardware accelerators 210 (e.g., video or audio accelerators), display interface 216, and audio interface 218 (any of which may embodied as disparate or combined components as noted above). In other aspects, SoC 900 may include data interfaces to network interface 138, volatile memory interfaces 212, or NV memory interfaces 214 when additional communication or memory components are embodied separately from SoC 900. Examples of these various components, functions, and/or entities, and their corresponding functionality, are described with reference to the respective components of the environment 100 and various configurations as illustrated by FIGS. 1-4.

Task switcher 128, either independently or in combination with other entities, can be implemented as computer-executable instructions maintained by memory 906 and executed by microprocessor cores 904 to implement various embodiments and/or features described herein. Task switcher 128 may also be provided integral with other entities of the SoC, such as integrated with one or both of core manager 130 another suitable software, firmware, or hardware component within SoC 900. Alternatively or additionally, task switcher 128 and the other components can be implemented as hardware, firmware, fixed logic circuitry, or any combination thereof that is implemented in connection with the I/O logic control 902 and/or other signal processing and control circuits of SoC 900.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   determining that a task being executed by a first core of a processor can be executed by a second core of the processor, the first core executing a first operating system that is different from a second operating system executed by the second core, the first core implementing a 64-bit or 32-bit instruction set and being configured to operate at a frequency of at least 100 MHz, the second core implementing a 16-bit or 8-bit instruction set and being configured to operate at a frequency of less than 100 MHz;
   switching execution of the task from the first core to the second core effective to decrease an amount of energy consumed by the processor, the switching execution comprising:
      determining, while the task is executing on the first core, respective switch points for execution of the task at an application level, a framework level, and a hardware level;
      generating, for the respective switch points, state information useful to switch execution of the task at the application level, the framework level, and the hardware level; and
      switching, at the respective switch points and via the state information, execution of the task from the first core to the second core at the application level, the framework level, and the hardware level.

2. The method of claim 1, wherein a first operating system executed by the first core of the processor is a full-featured operating system and the second operating system executed by the second core of the processor is a real-time operating system.

3. The method of claim 1, wherein switching execution from the first core to the second core includes migrating execution of the task from the first operating system to the second operating system.

4. The method of claim 1, wherein the first core of the processor is an advanced processor core and the second processor core is a real-time processor core or a microcontroller processor core.

5. The method of claim 1, wherein the 64-bit or 32-bit instruction set implemented by the first core includes more instructions than the 16-bit or 8-bit instruction set implemented by the second core.

6. The method of claim 1, wherein the processor further includes a third core implementing a 16-bit or 8-bit instruction set that is different from that of the second core and further comprising switching execution of another task from the first core or the second core to the third core effective to further decrease an amount of energy consumed by the processor.

7. The method of claim 1, wherein execution of the task by the first core of the processor initiates presentation of media and execution of the task by the second core of the processor continues the presentation of the media.

8. The method of claim 1, further comprising switching, responsive to user input, execution of the task from the second core of the processor back to the first core of the processor effective to enable another task executed by the first core of the processor to respond to the user input.

9. A method comprising:
   initiating an application via a first operating system, the first operating system executed by a first core of a processor, the first core implementing a 64-bit or 32-bit instruction set and being configured to operate at a frequency of at least 100 MHz, the application configured for execution by the first core;
   rendering, via the first operating system, a user interface of the application;
   determining when at least part of the application can be executed using a second operating system, the second operating system different from the first operating system and executed by a second core of the processor, the second core implementing a 16-bit or 8-bit instruction set and being configured to operate at a frequency of less than 100 MHz;
   switching, responsive to the determining, execution of the at least part of the application from the first core to the second core, the switching execution comprising:
      receiving, from the application, respective switch points of execution for the application at a software level, a firmware level, and a hardware level;
      generating, for the respective switch points, state information useful to switch execution of the application at the software level, the firmware level, and the hardware level;
      switching, at the respective switch points and via the state information, execution of the application from the first core to the second core at the software level, the firmware level, and the hardware level; and
   rendering, via the second operating system executed by the second core, content associated with the at least part of the application.

10. The method of claim 9, wherein the content associated with the at least part of the application includes video content or audio content.

11. The method of claim 9, wherein rendering the content includes directing the content to, or receiving the content from, a hardware accelerator configured to perform the rendering of the content.

12. The method of claim 11, wherein the content is streamed content and rendering the content associated with the at least part of the application includes directing data of the streamed content from a network interface to the hardware accelerator.

13. The method of claim 9, wherein the processor is embodied in a smart-phone, tablet computer, laptop computer, set-top box device, internet-protocol-enabled television, personal media device, or gaming device.

14. A system comprising:
   a processor configured to execute tasks of the system, the processor comprising:
      a first core configured to execute a first software at a frequency of at least 100 MHz, the first software being 64-bit or 32-bit software;
      a second core configured to execute a second software at a frequency of less than 100 MHz, the second software being 16-bit or 8-bit software that has less functionality than the first software, the second core having less current leakage than the first core; and
   a task switcher configured to:
      determine that a task being executed using the first software of the first core can be executed using the second software of the second core;
      transmit, responsive to the determination, an indication of a core switch to an application to which the task belongs;
      receive, from the application, respective switch points at which the task can be switched at an application level, a framework level, and a hardware level to the second core for execution using the second software;
      generate, for the respective switch points, state information useful to switch execution of the task at the application level, the framework level, and the hardware level; and
      switch, at the respective switch points and via the state information, execution of the task from the first software of the first core to the second software of the second core at the application, framework, and hardware levels effective to reduce an amount of energy consumed by the processor.

15. The system of claim 14, wherein the first software and the second software are different operating systems.

16. The system of claim 14, wherein the system is embodied in part or whole as a system-on-chip (SoC).

17. The system of claim 14, wherein the first core is capable of performing floating point arithmetic operations and the second core is not capable of performing floating point arithmetic operations.

* * * * *